UNITED STATES PATENT OFFICE.

WALTER M. NEWTON, OF WYOMING, DELAWARE.

PROCESS OF TREATING MOLDED ARTICLES.

968,591.     Specification of Letters Patent.     Patented Aug. 30, 1910.

No Drawing.     Application filed June 2, 1909. Serial No. 499,764.

*To all whom it may concern:*

Be it known that I, WALTER M. NEWTON, citizen of the United States, residing at Wyoming, in the county of Kent and State of Delaware, have invented certain new and useful Improvements in Processes of Treating Molded Articles, of which the following is a specification.

This invention relates to a process for the treatment of molded articles which are separated from the molds while in a plastic condition.

One of the principal objects of the invention is to provide a process or method of treating the article immediately after its separation from the mold so as to eliminate defects such as mold marks, cavities, and cracks, and when such articles are composed of fine and coarse material, to bring the coarse particles into relief, creating a surface of varied and pleasing appearance.

Other objects and advantages of the process, applying especially to articles molded of cement with other material, are to effect a more complete crystallization of the cement, a greater density of the product and increased strength and durability together with uniformity of appearance and coloring.

It has been customary heretofore in the production of molded concrete objects by the semi-dry process, to effect the most complete crystallization and fullest density by steam curing and the improvement in surface appearance by treating with chemicals, by scrubbing with steel brushes or by sand blast treatment, which methods can be employed only when the cement is partially or fully set, and are slow, expensive and unsatisfactory.

My invention has among its principal purposes the substitution of a quick reliable and efficient method for the tedious and expensive operation referred to, and one which will result in an improved product without requiring machinery or complex accessories.

To obtain the desirable results of my improved method of procedure, in carrying out my invention, I separate the article from the mold and apply to its surface a spray or mist which is projected against the article with whatever force is necessary to secure the results desired, and at such angle to the surface of the article as its contour and the improvement desired may require. The spray or mist may be projected from a water pipe or hose having a suitable nozzle so constructed as to render a satisfactory spray or mist, and the pipe or hose may communicate with any source of supply having the required head or force to create the necessary mist, spray or vapor.

In molding concrete products from cement with sand gravel and stone aggregates, by the semi-dry process, frequently surface defects occur, such as cracks, rough edges and cavities, and when this is treated immediately before any crystallization of the cement, with a spray of proper density and force projected from a suitable angle, the cement on the surface is taken up in solution by the water applied and flows into the cracks and depressions where it blends with and becomes an integral part of the completed article by crystallization assisted by the moisture of the spray.

In the semi-dry manufacture of concrete products without my process an action of the cement which is termed "the initial set" is lost from lack of moisture when first molded. With my process it is assured.

By the method herein described the particles of sand and cement are not removed or washed away from the face of the block or article, but are carried from the more prominent projections into the cavities and cracks, the force of the spray and the slight moisture only being sufficient to bring out the coarse particles in relief upon the face of the article.

I claim:

The herein described method of treating molded articles made up of sand, cement, gravel and broken stones by the semi-dry process, which consists in removing the article from the mold while in a semi-dry condition, projecting against the surface of the article an aqueous spray or vapor with such force and at the required angle to the surface of the article to eliminate defects in said surface by forcing the finer particles of the aggregates into the depressions, cavities or cracks by the force of the spray, thus bringing into relief the coarser aggregates, and then drying the article.

WALTER M. NEWTON.

Witnesses:
   WILLIAM M. HOPE,
   JOHN B. WHARTON.